United States Patent Office 3,842,167
Patented Oct. 15, 1974

3,842,167
TOOTHPASTE
Max Block, Surbiton, and Charles Andrew Watson, Ruislip, England, assignors to Lever Brothers Company, New York, N.Y.
No Drawing. Filed Oct. 20, 1972, Ser. No. 299,578
Claims priority, application Great Britain, Oct. 22, 1971, 49,321/71
Int. Cl. A61k 7/16
U.S. Cl. 424—49     2 Claims

ABSTRACT OF THE DISCLOSURE

A visually clear dentifrice containing a solid phase comprising a particulate material having a refractive index of 1.44 to 1.48 and an aqueous liquid phase of substantially the same refractive index as the solid phase, the liquid phase comprising an aqueous solution of maltodextrins and, to provide humectancy, glycerine or sorbitol or a mixture thereof. The use of a solution of maltodextrins as part of the liquid phase of the dentifrice enables the raw material cost of the dentifrice to be reduced.

---

This invention relates to toothpastes, and especially to those which are visually clear, i.e. substantially translucent or transparent.

In recent years there have appeared on the market in various countries of the world, toothpastes which are visually clear resembling a gel in appearance. Although these pastes transmit light to a high degree they nevertheless contain a proportion, usually between about 10% and 25% by weight, of insoluble solid material in order to impart abrasivity to the toothpaste. This solid material is invisible in the toothpaste because the refractive index of the liquid phase of the toothpaste is made to have about the same value as that of the solid abrasive component. The abrasive agents of such toothpastes which are currently being used include synthetic, amorphous, porous silica xerogels, as described in U.S. Pat. No. 3,538,230. These materials have a refractive index of about 1.45. Other materials having acceptable abrasive characteristics and of similar refractive index can also be used.

Amorphous silica is very suitable for use in visually clear dentifrices because its refractive index is very similar to the refractive indices of the humectant liquids commonly used in toothpastes, i.e. glycerine and sorbitol syrup. However, the refractive indices of glycerine and sorbitol syrup are so close to the refractive index of amorphous silica that the proportion of water which can be present in the liquid phase of the toothpaste without loss of the visually clear properties is limited. As a consequence of this and of the use of comparatively low levels of abrasive material, relatively high levels of the humectants have been used in these toothpastes. In current commercial products the amount of humectant present, glycerine or sorbitol syrup or a mixture thereof, is about 65% to 85% by weight of the toothpaste. Consequently, the cost of manufacturing visually clear toothpastes is relatively high because of the high proportion of glycerine and/or sorbitol syrup that they contain.

It is an object of the invention to provide a visually clear dentifrice of lower raw material cost.

We have now found that cheaper visually clear toothpastes can be made by partly replacing the glycerine and/or sorbitol syrup by an aqueous solution of maltodextrins.

According to the present invention there is provided a visually clear dentifrice containing a solid phase comprising a particulate material having a refractive index of 1.44 to 1.48 and an aqueous liquid phase having substantially the same refractive index as the solid phase and comprising an aqueous solution of maltodextrins and, to provide humectancy, glycerine or sorbitol or a mixture thereof.

Maltodextrins are starch hydroylsates having a dextrose equivalent of less than 20. They are well known materials which have found widespread application in the food industry and are made by acid or enzyme hydrolysis of various starches, particularly corn starch. We have found that aqueous solutions of maltodextrins are very satisfactory for use as components of the liquid phase of visually clear dentifrices.

Since maltodextrins have substantially no humectancy it is necessary for the liquid phase of dentifrices of the invention to comprise glycerol or sorbitol or a mixture thereof to provide the desirable humectancy properties. Corbitol is usually incorporated in toothpastes in the form of sorbitol syrup, a 70% by weight squeous solution of sorbitol, and it is convenient therefore to express the amount of sorbitol present in terms of the equivalent amount of sorbitol syrup. In order to provide humectant properties, the liquid phase of the toothpaste desirably comprises at least about 25% by weight, calculated on the liquid phase, of glycerine or sorbitol syrup or a mixture thereof.

Since glycerine and sorbitol syrup themselves have refractive indices in the range 1.44 to 1.48, it is necessary to have sufficient maltodextrin dissolved in the aqueous liquid phase to give substantially the same refractive index. Consequently, the concentration of the maltodextrin in the water added, additional to provided by any sorbitol syrup, should be between about 50% and 70% by weight, more particularly from 55% to 68% by weight.

The amount of maltodextrin present in the aqueous liquid phase of the toothpaste preferably amounts to at least 10% by weight, calculated as anhydrous material, of the liquid phase.

The abrasive cleaning ingredients which may be included in the toothpaste of the invention are preferably the silica xerogels as described in U.S. Pat. No. 3,538,230. These are commercially available both from Grace Davison Chemical, USA (e.g. under the trade names Syloid 63 and Syloid 74) and from Joseph Crosfield & Sons Limited, England (e.g. under the trade names Gasil 200 and Gasil 35). Silica-alumina xerogels and silica-magnesia xerogels as described in our co-pending application No. (Case J. 405) may also be used. Sodium aluminosilicates and other alkali and alkaline-earth metal aluminosilicates such as those described in Netherlands Patent Application No. 7112989 may also be used. Other suitable materials are precipitated silica and co-precipitates of silica and aluminium hydroxide having a $SiO_2:Al_2O_3$ molar ratio of 24 to 6:1. These silica and silicate materials, or mixtures thereof, are desirably included in amounts of from about 5% to about 30%, preferably 10% to 25%, by weight of the toothpaste. The cleaning agent may have an average particle size of about 1 to 65 microns, preferably from 2 to 20 microns.

The visually clear toothpaste of the invention may contain other ingredients known to those skilled in the art. Thus there may be present an agent for thickening or gelling the liquid phase, such as a pyrogenic silica, silica aerogel or synthetic inorganic silicate clay such as is referred to in the above Netherlands application, e.g. the synthetic clay sold under the trademark Laponite CP or Laponite SP. Small proportions of an organic hydrocolloid thickener may also be used.

The dentifrice of the invention will usually also include from about 1% to about 3% by weight of a detergent, for example sodium lauryl sulphate or sodium lauroyl sarcosinate. There may also be included minor amounts of a sweetening agent (for example soluble saccharin), a flavouring agent (for example oils of spearmint, peppermint, wintergreen), chloroform, a fluorine-containing material (for example sodium fluoride, stannous fluoride, sodium monofluorophosphate), an antibacterial agent (for example 1,6-di-(p-chlorophenyl biguanido) hexane or a non-toxic acid addition salt thereof), preservative (for example sodium benzoate), buffering agent, or colouring agent. Polyethylene glycol (MW 1540) may also be included to enhance transparency. The toothpaste may also include materials to give various visual effects, such as coloured particles, pearlescent flakes or iridescent particles.

The following Example of a transparent toothpaste formulation illustrates the invention. Percentages are by weight.

EXAMPLE

| | Percent |
|---|---|
| Silica xerogel | 14.0 |
| Sorbitol syrup | 27.0 |
| Maltodextrin powder | 28.5 |
| Water | 19.9 |
| Silica aerogel | 1.0 |
| Sodium carboxymethylcellulose | 1.2 |
| Sodium lauryl sulphate | 1.5 |
| Saccharin (soluble) | 0.2 |
| Polyethylene glycol (MW 1540) | 5.0 |
| Flavouring agent | 1.0 |
| Colouring agent solution | 0.7 |

This product is of substantially cheaper raw material cost than the corresponding transparent toothpaste containing a liquid phase consisting substantially of sorbitol syrup and/or glycerine.

A suitable silica xerogel is that available from Joseph Crosfield & Sons Limited of Warrington, England, under the name Gasil 200: this material has an average particle size of about 10 microns. Other xerogels can also be used, for example the silica-alumina xerogels available from the same company under the name Synclyst.

As the maltodextrin powder, there may be used a material known as Snowflake Ref. 01913, made by Corn Products Corporation; this has a dextrose equivalent of between about 17 and 20. A further example of a suitable maltodextrin product that can be used is Morsweet hydrolysed cereal solid Ref. 01908 also made by Corn Products: this has a dextrose equivalent of 5.

As the silica aerogel may be used the one produced by Joseph Crosfield & Sons Limited under the name Gasil 23: this has an average particle size of about 3 microns. Syloid 244 manufactured by Grace Davison Chemical of USA is also a silica aerogel material which could be used.

What is claimed is:
1. A visually clear dentifrice consisting essentially of
   (a) about 5% to about 30% by weight of a solid phase comprising a particulate abrasive material having a refractive index of about 1.44 to 1.48 and an average particle size of 1 to 65 microns; and
   (b) a liquid phase of substantially the same refractive index as the solid phase and comprising
      (i) at least about 25% by weight of the liquid phase of a liquid humectant material selected from the group consisting of glycerine and sorbitol syrup; and
      (ii) an aqueous solution of maltodextrins containing about 50% to about 70% by weight of maltodextrins, the amount of maltodextrins being at least about 10% by weight of the liquid phase of the dentifrice.
2. A visually clear dentifrice as claimed in claim 1, wherein the abrasive material comprises a silica xerogel.

References Cited

UNITED STATES PATENTS 3,711,604  1/1973  Colodney et al. _____ 424—52

OTHER REFERENCES

Chemical Abstracts, Vol. 69, entry 61294v, 1968.

RICHARD L. HUFF, Primary Examiner